April 12, 1927. 1,624,141
F. KRUCKENBERG ET AL
BRAKING ARRANGEMENT FOR HIGH SPEED SUSPENSION RAILWAYS
Filed Jan. 24, 1925  2 Sheets-Sheet 1
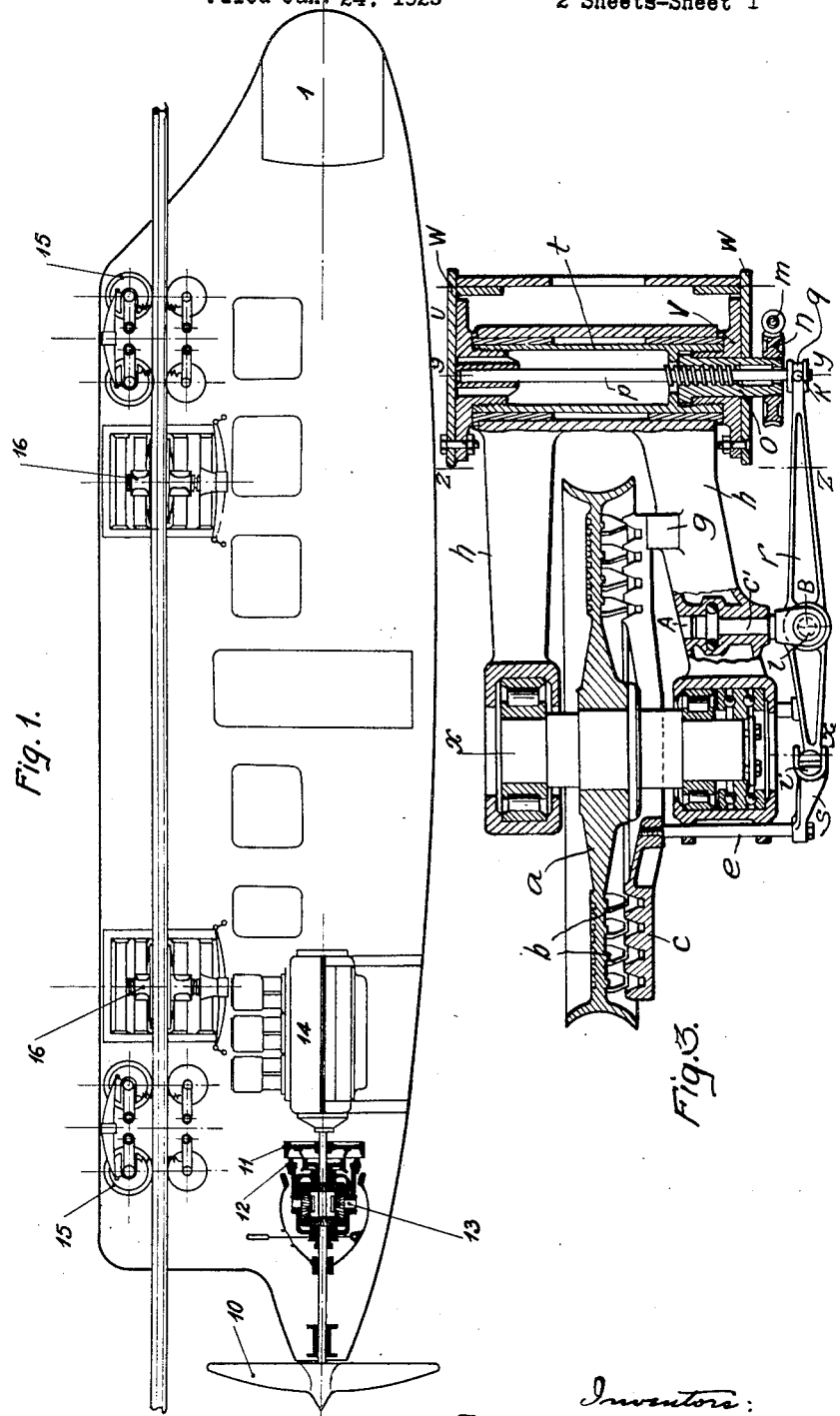

April 12, 1927.
F. KRUCKENBERG ET AL
1,624,141
BRAKING ARRANGEMENT FOR HIGH SPEED SUSPENSION RAILWAYS
Filed Jan. 24, 1925　　2 Sheets-Sheet 2
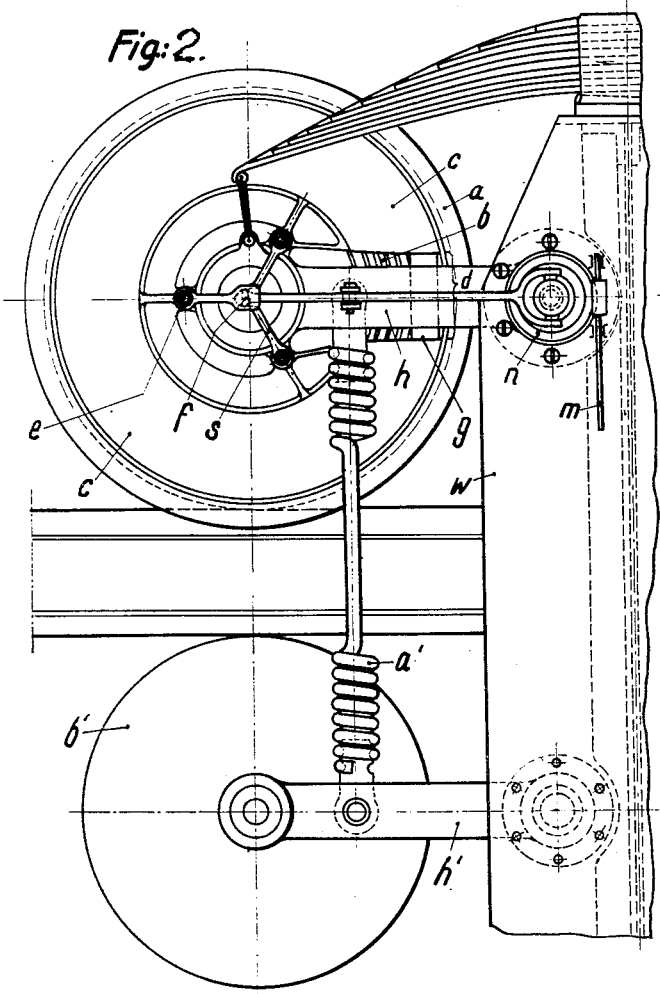
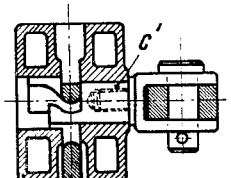
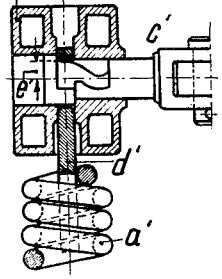

Patented Apr. 12, 1927.

1,624,141

UNITED STATES PATENT OFFICE.

FRANZ KRUCKENBERG AND CURT STEDEFELD, OF HEIDELBERG, GERMANY; SAID STEDEFELD ASSIGNOR TO SAID KRUCKENBERG.

BRAKING ARRANGEMENT FOR HIGH-SPEED SUSPENSION RAILWAYS.

Application filed January 24, 1925, Serial No. 4,574, and in Germany August 29, 1923.

The invention is intended to provide braking arrangements for high speed suspension cars moving with a velocity of 200 to 300 M. P. H. At these speeds the common railway brake with shoes acting on the tire is inadequate. In an attempt to brake the running wheel at full speed in this manner both wheel and rail would be unduly stressed and an undesirable roughening of the surface and unequal wear of both parts would result. Moreover at the braking surfaces a highly undesirable overheating would take place causing them to wear very rapidly. A simple brake on the running wheel would not be able to provide the necessary retardation in an emergency.

The principal object of the present invention is to provide a wheel brake for cars of this type which will obviate these disadvantages.

In the accompanying drawings which illustrate my invention:

Fig. 1 is a longitudinal side view of a suspension car having my improved wheel brake applied thereto, indicated at 15.

Fig. 2 is a side view of the brake and illustrates the details of construction.

Fig. 3 is a horizontal sectional view taken along a plane through the axis of the running wheel.

Fig. 4 shows a detail of the brake structure comprising a cam arrangement whereby the counter wheel is automatically pressed against the rail when the brakes are applied.

Fig. 5 shows the same structure as Fig. 4, and the relative position of the parts at the time of braking stress.

In the wheel brakes 15 shown in Fig. 1 because of the reasons already explained, the running wheels are not brakes on the periphery as in the ordinary railway but axially from the side. At the same time running gear is provided with counter wheels combined with springs of variable tension, so that the running wheel is more firmly pressed on the rail and the adhesion and braking effect thereby increased.

Figs. 2 to 5 show a design for this brake. It is made as a corrugated disc brake of which the running wheel forms the one disc while the other is pressed axially by mechanical, pneumatic, electric or other means against the running wheel. In the arrangement shown the disc brake is formed with concentric corrugations having the greatest possible wedging action without a tendency to lock, and on the side of the running wheel special brake rings $b$ are fastened, made of good wearing material, for example steel or similar material. If the wheels and rings are made in one piece, there is the danger that the unsymmetrical centrifugal force will cause a bending stress that would cause the wheel to dish. The running wheels in this railway are rotating with high R. P. M. whereby the centrifugal force is very great. The balancing of the unsymmetrical centrifugal stresses due to the braking by putting dead weight on the other side of the wheel would increase the weight of the latter to a highly undesired extent. Therefore special concentric rings $b$ are fastened to the wheel disc by means of screws or the like. These brake rings at high rotational speeds are only maintained concentric by the disc. Their expansion due to the centrifugal force corresponds to the increase of diameter of the wheel. Engaging with these brake rings is the brake disc $c$ made of material of good wearing qualities but with a high friction coefficient, such as cast iron or aluminium alloy. This brake disc can be easily replaced if it is provided with the slot $d$, in the rim, so that it can be draw away from the axle and renewed. It is held by three guiding bolts which are arranged in a three-cornered bridgepiece $s$ actuated by the lever $r$. It is preferable that the force is not applied at the center point, but at the center of area of the friction plate so that force and wear on the sectors, remaining when the slot $d$ has been cut away, is equalized. The torque of the brake disc $c$ is taken by special machined faces $g$ on the bearer arm $h$ in which the axle of the running wheel is carried.

In the arrangement of running gear shown, the axle of the running wheel $x$—$x$ carried in forked links $h$, receives all the original shocks; the hingepin $y$—$y$ of the fork is part of the car, and does not move relative to it. Therefore the position of the axle $x$—$x$ changes with respect to the pin $y$—$y$ and the arrangement of the lever $r$ from the point $i$ of the axle $x$—$x$ to the point $k$ on the axis $y$—$y$ with only one intermediate support $l$ on the arm $h$ is the most advantageous.

In the arrangement shown the brake lever $r$ is moved and the brake applied by a mechanical arrangement from inside the car. The worm spindle $m$ is turned which turns the worm wheel $n$ on which is mounted the nut $o$. In this way the screwed spindle $p$ is moved axially and moves by the collar $q$ the end $k$ of the lever $r$. The other end $i$ of the latter by means of the three cornered bridge piece $s$ and the three bolts applies the brake disc $c$ against the brake rings $b$ on the running wheel $a$.

A special new arrangement increases the adhesion of the running wheel on the rail during the braking period, so that the wheel brake can be applied harder than would otherwise be the case, without danger of skidding the braked wheel and forming flats on the tire. On the under side of the rail are running counter wheels $b'$, which are carried in a similar manner on forked bearer arms $h'$. The bearer arms $h$ and $h'$ of the running and counter wheels are steadily pressed together by a spring $a'$. During the braking period the tension in this spring will be increased. This increase of tension, as in the arrangement shown, is effected by making the intermediate point $l$ of the lever $r$ instead of being fixed to the supporting arm $h$ hinged to a cam bolt $c'$. When the brake is off the upper spring anchor $d'$, Fig. 4, is fastened to the lowest point of the cambolt $c'$, i. e. both supporting arms $h$ and $h'$ are only lightly drawn together by the spring $a'$. When the brake is applied, the force applied at the end of the lever $r$ at the point $k$, and the resulting force at the point $i$ move the lever away from the arm $h$ which slides the cam bolt with respect to the spring support. In this new position of the cambolt $c'$, Fig. 5, the anchor $d'$ is elevated to the highest point of the cam $c'$, the relatively stiff spring $a'$ is further tensioned to the extent of the lift $e'$. When the brake is released this additional tension is again released by the cambolt's $c'$ returning to its normal position. This simplest possible arrangement of cambolt shown can naturally be technically improved by a roller on the spring end $d$.

What we claim is:

1. In a braking device for a high speed suspension car the combination with the car body and one of the suspension wheels therefor, of an arm member pivoted at one end to the car body and having said suspension wheel supported at the free end, means for braking said wheel, mechanism for actuating said braking means, said actuating mechanism being disposed adjacent to the pivot of said arm.

2. A brake for a high speed car supported by suspension wheels from elevated rails, comprising in combination with the car body and one of the suspension wheels therefor, of means for braking said wheel, a counter wheel bearing on a portion of the rail surface opposite to that supporting said suspension wheel, and means for simultaneously increasing the pressure exerted by both wheels upon the rail surface.

3. A brake for a high speed car supported by suspension wheels from elevated rails, comprising in combination with the car body and one of the suspension wheels therefor, of means for braking said wheel, a counter wheel bearing on a portion of the rail surface opposite to that supporting said suspension wheel, and mechanism for simultaneously actuating said braking means and increasing the pressure exerted by both wheels upon the rail surface.

4. In a braking device for a high speed car supported by suspension wheels from elevated rails, the combination with the car body and one of the suspension wheels therefor, of an arm member pivotally supported upon said car body and having said suspension wheel attached to the free end thereof, means for braking said wheel, a counter wheel bearing on a portion of the rail surface opposite to that supporting the suspension wheel, and means comprising a lever supported by said arm member for actuating said braking means and increasing the pressure exerted by both wheels upon the rail surface.

5. In a braking device for a high speed car supported by suspension wheels from elevated rails, the combination with the car body and one of the suspension wheels therefor, of an arm member pivotally supported upon said car body and having said suspension wheel attached to the free end thereof, means for braking said wheel, a counter wheel bearing on a portion of the rail surface opposite to that supporting the suspension wheel, tensioning means connecting said counter wheel and said suspension wheel, a cam bolt attached to said arm member and having a lever pivotally supported thereon, said lever and cam bolt being so arranged and constructed that the action of the tensioning means may be regulated thereby.

6. In a braking device for a high speed car supported by suspension wheels from elevated rails, the combination with the car body and one of the suspension wheels therefor, of an arm member pivotally supported upon said car body and having said suspension wheel attached to the free end thereof, means for braking said wheel, a counter wheel bearing on a portion of the rail surface opposite to that supporting the suspension wheel, spring tensioning means connecting said counter wheel and said suspension wheel, a cam bolt attached to said arm member, a lever pivotally supported by said cam bolt for operating said braking means, said cam bolt and lever being constructed and arranged so that the action of the braking means and tensioning means may be simultaneously regulated thereby.

7. In a braking device for a high speed suspension car the combination with the car body and one of the suspension wheels therefor, of an arm member pivoted at one end to the car body and having said suspension wheel supported at the free end, braking means for said wheel comprising two mutually engageable corrugated surfaces, one of said surfaces being formed of a plurality of concentric rings fixed to said wheel and made from a metal having good wearing properties, the other of said surfaces being a brake plate formed of a material having a high frictional coefficient, means for interengaging said surfaces, and braking said wheel, means for transmitting said braking torque to machined faces provided on the arm member.

8. In a braking device for a high speed suspension car the combination with the car body and one of the suspension wheels therefor, of an arm member pivoted at one end to the car body and having said suspension wheel supported at the free end, a plurality of concentric rings made of a material having high wear-resistance properties fixed to the side of said wheel and forming a frictional surface thereon, a brake plate provided with a corrugated surface of a material having a high coefficient of friction on one side and having a centrally located aperture therein for inserting the axle of said wheel, and means for applying a uniformly distributed pressure to said brake plate whereby said plate may be moved in a plane parallel to the plane of rotation and said friction surfaces brought into engagement.

9. In a braking device for a high speed suspension car the combination with the car body and one of the suspension wheels therefor, of an arm member pivoted at one end to the car body and having said suspension wheel supported at the free end, means for braking said wheel, a lever for operating said braking means pivotally supported at a point intermediate its ends to said arm member, and regulatable means disposed within the pivotal support of said arm member for actuating said lever.

In testimony whereof we affix our signatures.

FRANZ KRUCKENBERG.
CURT STEDEFELD.